July 15, 1952

A. H. KETTLER 2,603,724

SOUND TRANSLATING DEVICE ARRANGED
TO ELIMINATE EXTRANEOUS SOUND

Filed Oct. 30, 1948

INVENTOR
Alfred H. Kettler
BY Morris A. Robin
ATTORNEY

Patented July 15, 1952 2,603,724

UNITED STATES PATENT OFFICE 2,603,724

SOUND TRANSLATING DEVICE ARRANGED TO ELIMINATE EXTRANEOUS SOUND

Alfred H. Kettler, Collingswood, N. J., assignor to Radio Corporation of America, a corporation of Delaware Application October 30, 1948, Serial No. 57,475

9 Claims. (Cl. 179—182)

Figure 1:
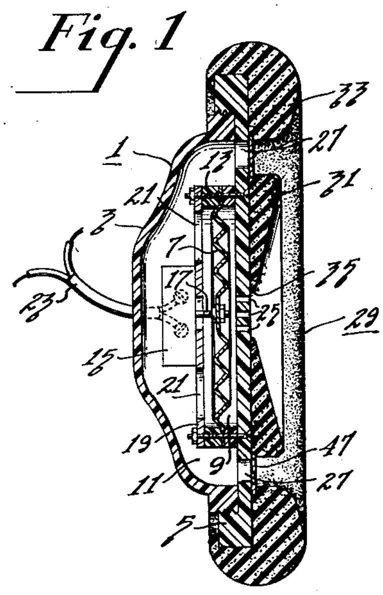

This invention relates to sound translating devices, and more particularly to an improved sound-powered telephone unit which will avoid the pick up of undesirable noise when it is not being worn by the user.

The sound translating device particularly referred to herein is of the headset type commonly used in sound-powered telephone systems. Telephone headsets usually consist of a pair of telephone receiver units attached at the ends of a resilient support, and are worn on the head of a listener, the receiver units being in contact with the listener's ears. Sound translating devices of this type are particularly adapted for use in telephone communication systems in locations where there is considerable noise as, for example, in numerous military applications, or in radio broadcasting of sports events, public gatherings, and the like. Telephone receivers of this kind possess the characteristic of functioning as transducers, that is, they can operate as transmitters as well as receivers. It frequently becomes necessary for a listener to remove his headset and hang it on a hook, or lay it down. Under these circumstances, since the receivers remain connected to the telephone system, the telephone receivers act as transmitters which pick up and feed noise into the system, thereby seriously lowering intelligibility to listeners located at other points throughout the system. Heretofore, attempts have been made to solve this problem by providing a switch for the headset receivers which will enable the user to disconnect his headset from the system when it is not in use. This method, however, has proven to be impractical for certain applications. For example, on a battleship where there is often considerable noise and confusion, the user is unmindful of the situation and frequently forgets to disconnect his headset from the system. It is, therefore, the primary object of the present invention to provide an improved structure for sound translating devices which will automatically prevent the pick up and transmission of noise into the sound-powered system while the instruments are not being used, although still connected into the system.

Another object of the invention is to provide a sound translating device which permits an equalization of pressure on both sides of the vibratory element, whereby undesirable noise will be effectively cancelled and prevented from being fed into the telephone system.

Still another object of the invention is to provide an improved structure for a sound translating device of the type set forth above which will effectively prevent sounds originating externally of the device from being heard by the listener, thereby insuring clarity and substantially perfect transmission of sounds intended to be transmitted to the listener.

A further object of the invention is to provide an improved structure for sound translating devices of the type indicated above which will effectively cancel out background noises from all directions in counter-balancing or cancelling relation, when said device is not in use although connected in the sound-powered system, and which will also be substantially unaffected by noises originating externally of the device while it is in use, thereby permitting only desired signals to be transmitted to the ear of the user.

In accordance with the invention, a sound translating device, such as a sound-powered telephone receiver, is provided with a casing having a vibratory member mounted therein so that the air space in which it is immersed in the casing is separated into a pair of compartments or chambers. Each of the compartments or chambers is separately connected with the exterior of the casing through discretely arranged openings in the casing. Undesirable sounds originating externally of the casing will be transmitted through the openings and chambers and will impinge on opposite sides of the vibratory element with substantially equal force and thereby be effectively cancelled when the instrument is not in use. An ear cap is provided on the exterior of the casing which prevents any undesirable, external sounds from entering the interior of the casing when it is in use. The ear cap also effectively prevents these undesirable sounds from being heard by a listener when the device is in use, and, at the same time, permits useful signals transmitted by the telephone system to be more clearly heard.

Figure 3:
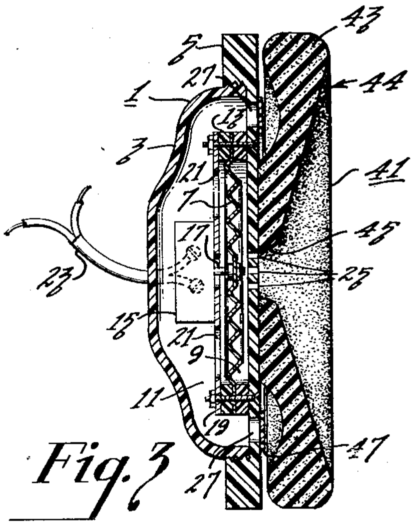
Figure 2:
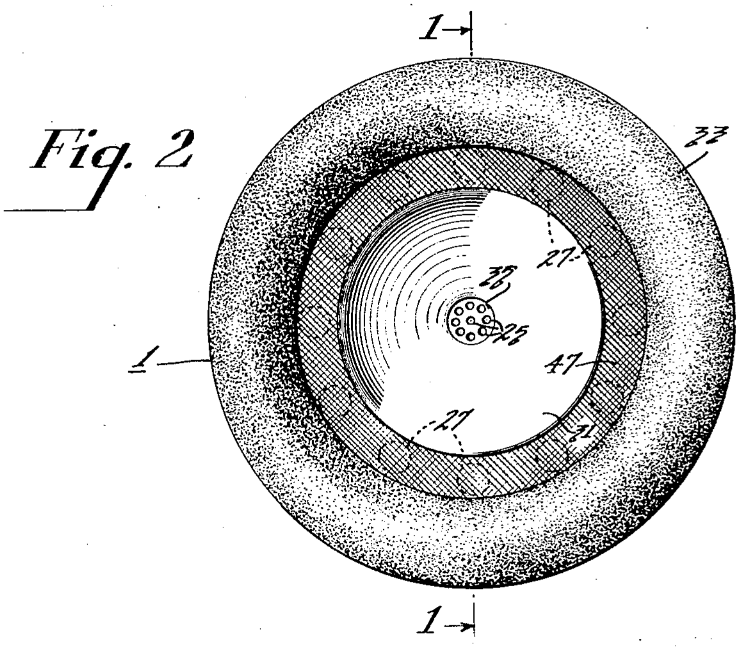

The novel features characteristic of the invention, as well as additional advantages thereof, will be understood better from the following detailed description of two embodiments thereof when read in connection with the accompanying drawing, in which Figure 1 is a cross section of a telephone receiver, in accordance with one embodiment of the invention, taken on the line 1—1 of Figure 2, Figure 2 is a front elevation of the telephone receiver shown in Figure 1, and Figure 3 is a cross section, similar to Figure 1, of a telephone receiver in accordance with a second embodiment of the invention.

Referring more particularly to the drawing, wherein similar reference numerals are used to designate corresponding parts throughout, there is shown, in Figures 1 and 2, a telephone receiver 1 of the type commonly used in sound-powered telephone headsets. The telephone receiver 1 comprises a casing 3 having a removable cover 5 on its front side. Mounted in the interior of the casing is a vibratory member 7, illustrated as a disc diaphragm, which divides the interior of the casing into separate compartments or chambers 9, 11 disposed on opposite sides of the vibratory member. In the two modifications illustrated in the drawing, the diaphragm 7 is shown mounted on the casing cover 5 by means of a suitable, annular support 13 which will maintain the diaphragm in spaced relation to the cover 5. The air chamber or cavity 9 is thus defined by the cover 5, diaphragm 7, and support 13. An electro-mechanical converter 15, of any suitable kind, is also mounted within the casing, and is operatively connected to the diaphragm 7 by means of a drive rod 17, the entire assembly functioning in a manner well known in the art. As shown in Figure 1, the converter 15 is carried by a suitable support 19 attached to the diaphragm support 13. The support 19 is provided with openings 21, or is otherwise suitably arranged, so that the rear of the diaphragm will be freely accessible to sound waves entering the chamber 11. For the purpose of connecting the converter 15 into the sound-powered system, a suitable cable 23 is provided which extends through an opening (not shown) in the casing 3 in known manner.

The front side 5 of the casing is provided with a plurality of openings 25, 27 which afford communication between the exterior of the casing 3 and each of the compartments or chambers 9, 11. The openings 25 communicate with the air chamber 9 and are centrally arranged in the cover or front side 5 of the casing. The openings 27 communicate with the air in the chamber 11, and are arranged in circumferential, spaced array adjacent the periphery of the cover 5, and in spaced relation to the centrally disposed openings 25. When the headset is not being worn by a user, the openings 25, 27 permit sound waves originating externally of the casing 3 to enter the casing and impinge on opposite sides of the diaphragm 7 with substantially equal force. The undesirable sound waves are effectively cancelled and prevented from being picked up and transmitted into the sound-powered telephone system.

The telephone receiver is provided with an ear cap for the purpose of excluding undesirable external sounds and also for permitting the instrument to be worn with greater comfort. One type of ear cap 29 consists of an inner member 31 and an outer member 33, both of which are preferably made of flexible material, such as sponge rubber, and which can be applied in contact with the ear and head under moderate pressure, so as to mold the irregular contour of the ear and head into the flexible material. The inner member 31 is attached, in any suitable manner, to the front plate 5 between the centrally disposed openings 25 and the discretely arranged peripheral openings 27. The inner member 31 is provided with a centrally disposed aperture 35 which is in registry with the openings 25 in the casing 3, and which tapers outwardly so that, when the outer periphery of the inner member 31 engages a person's ear, an enclosed passage is provided for communication with the auditory canal of the ear.

The outer member 33 comprises an annular element which is also attached, in any suitable manner, to the casing 3 adjacent the periphery of the front plate 5 and is radially spaced from the peripherally disposed openings 27 around the entire circumference. The outer member 33 is also spaced radially from the inner member 31 and extends somewhat farther from the front plate 5 than the inner member, and it is so dimensioned that it will span the human ear and contact the head of the person using the instrument. When in contact with the person's head, the outer member 33 provides a seal which prevents undesirable external sound waves from entering the casing through the peripheral apertures and, at the same time, prevents them from being heard by the listener. In addition, when the inner member 31 is in contact with the listener's ear and the outer member 33 is in contact with the listener's head, an enclosed chamber is provided for the sound waves produced by the back of the diaphragm, and only the sound waves produced by the front of the diaphragm will be heard by the listener.

In accordance with a second embodiment of the invention, which is illustrated by Figure 3, the telephone receiver unit is constructed similarly to that shown in Figures 1 and 2 and includes the vibratory member 7 which is supported within the casing 3 and separates the interior of the casing into separate air chambers or compartments 9, 11, each of the chambers or compartments communicating with the exterior of the casing through separate openings 25, 27. The second modification, however, differs from the embodiment shown in Figures 1 and 2 in the ear cap provided on the exterior of the casing. As shown in Figure 3, there is provided a one piece annular ear cap 41 which is connected to the front plate 5, in any suitable manner, between the centrally disposed apertures 25 and the discretely arranged peripheral apertures 27. Like the ear cap 29 in Figures 1 and 2, the ear cap 41 is constituted of a yieldable material, such as sponge rubber or the like, and has an outwardly extending flanged portion 43 in a plane normal to its axis, the peripheral edges of the flange 43 extending radially beyond the peripheral apertures 27. The flanged portion 43 is spaced from the front plate 5 so that, when the receiver is not in use, the peripheral openings 27 will be exposed to the ambient, and sound waves originating externally of the receiver will be permitted to enter the casing through the openings 25, 27, and impinge with substantially equal force on both sides of the diaphragm 7, in which case they will effectively cancel and will have substantially no effect on the diaphragm. On the other hand, when the receiver is in use and is in contact with the ear of a user, sufficient pressure is exerted on the ear cap 41 against the marginal portion 44 thereof to cause its flanged portion 43 to contact the front plate 5 and form an effective seal for the peripheral openings 27, thereby completely closing the air chamber 11. The ear cap 41 is provided with a central opening 45 which tapers outwardly for communication with the auditory canal of the ear, and which is also in registry with the central openings 25 of the casing. Thus, an enclosed passage is formed by the ear cap 41 when it is in contact with the listener's ear and only sound waves produced by the front of the diaphragm 7 will be transmitted to the user's ear.

It will, of course, be recognized by those persons skilled in the art that, in the design of the sound translating devices described above, the acoustical proportions of the apertures and volumes of the chambers on opposite sides of the vibratory member must be suitably determined to prevent excessive phase shift or resonance.

For the purpose of protecting the electro-mechanical converter 15 against foreign particles of dirt and dust, a screen or membrane of suitable material may be provided over the openings in the casing, such, for example, as the screen 47 covering the discretely arranged, peripheral apertures 27.

While only two modifications of the present invention have been illustrated, it will be recognized by those persons skilled in the art that other modifications and changes will readily suggest themselves, and that the improved structure may be applied to sound translating devices other than the sound-powered telephone receivers shown and described herein. Therefore, it is desired that the particular forms of the invention described herein be considered merely as illustrative and not as limiting.

What is claimed is:

1. In a transducer for use in contact with a human ear, the combination of a casing having a first aperture and a plurality of additional, discrete apertures disposed around said first aperture in spaced relation thereto, a vibratile element mounted within said casing in spaced relation to opposite walls thereof to thereby divide the interior of said casing into separate compartments, one of said compartments communicating with the exterior of said casing through said first aperture and the other of said compartments communicating with the exterior of said casing through said discrete apertures, whereby sound waves originating externally of said casing may enter said casing through all of said apertures and impinge on opposite sides of said vibratile element with substantially equal force, and an ear cap constituted of yieldable material carried by said casing and dimensioned to span the ear and extend beyond said discrete apertures, said ear cap being arranged to form a closure for said discrete apertures when said ear cap is placed in operative contact with the ear, in a manner to prevent sound waves of external origin from being transmitted through said discrete openings, said ear cap also having a portion thereof arranged in a manner to form a closure when in contact with said human ear to prevent sound waves transmitted through said discrete apertures from entering the auditory canal of said human ear, said portion including an aperture in registry with said first mentioned aperture whereby sound waves generated by said vibratile element will be transmitted through said first aperture directly to the auditory canal of said human ear.

2. A transducer according to claim 1 characterized in that all of said apertures in said casing are disposed in one side of said casing, and further characterized by the addition of an electro-mechanical converter mounted within said casing and operatively connected to said vibratile element.

3. A transducer according to claim 2 characterized in that said ear cap comprises an annular element connected to said one side of said casing between said first aperture and said discrete apertures, said annular element having an outwardly extending, flexible, flanged portion disposed in a plane normal to its axis in closely spaced relation to said one side.

4. A transducer according to claim 2 characterized in that said ear cap comprises inner and outer concentrically arranged annular members, said inner member being carried by said casing intermediate said first aperture and said discrete apertures for contacting the ear, said outer member also being carried by said casing circumferentially about said discrete apertures and being the member which is dimensioned to span the ear for contact with the head of the user thereby to provide a fluid-tight seal around the ear.

5. A sound translating device for use in contact with the ear of a listener using said device, said device comprising a casing having a chamber therein, a vibratory member mounted within said casing in spaced relation to opposite walls thereof to thereby divide said chamber into a pair of cavities, an electro-mechanical converter mounted in said casing and being operatively connected to said vibratory member, said casing having a plurality of apertures therein certain ones of which connect the exterior of said casing with one side of said vibratory member, and certain others of which connect the exterior of said casing with the opposite side of said vibratory member, whereby sound waves originating externally of said casing may impinge on opposite sides of said vibratory member with substantially equal force and be effectively cancelled, and an ear cap mounted on the exterior of said casing, said ear cap including (1) a portion having a passage communicating with said first named certain apertures for providing a closed passage between said first named certain apertures and the auditory canal of the ear when said device is applied to the ear, and (2) a portion constituting an annular, flexible element providing a closure for said second named certain apertures when said device is applied to the ear.

6. A sound translating device according to claim 5 characterized in that said first named certain apertures are centrally located in one side of said casing, and characterized further in that said second named certain apertures are circumferentially disposed about and in spaced relation to said centrally located apertures.

7. A sound translating device according to claim 6 further characterized in that said first named ear cap portion is connected to said one side of said casing between said centrally located apertures and said circumferentially disposed apertures, and still further characterized in that said flexible element comprises a marginal flanged portion of said first named ear cap portion which extends beyond said circumferentially disposed apertures and provides the effective seal for said apertures when said device is in contact with the ear.

8. A sound translating device according to claim 6 further characterized in that said first named ear cap portion comprises a flexible inner member connected to said one side of said casing between said centrally located apertures and said circumferentially disposed apertures, and said flexible element comprises an annular, outer member connected to said one side of said casing about said circumferentially disposed apertures.

9. A sound translating device according to claim 8 characterized in that said inner member is provided with a central aperture in registry with said centrally located apertures thereby to provide an enclosed passage between said centrally located apertures and the auditory canal of the ear, and said outer member being dimensioned to span the ear thereby to provide an acoustic seal for said circumferentially disposed apertures when said outer member is in contact with the head of said listener.

ALFRED H. KETTLER.

REFERENCES CITED

The following references are of record in the file of this patent:

UNITED STATES PATENTS

| Number | Name | Date |
|---|---|---|
| 874,004 | Haff | Dec. 17, 1907 |
| 1,584,662 | Schuloff | May 11, 1926 |
| 1,653,727 | Oberst | Dec. 27, 1927 |
| 2,407,731 | Woodruff | Sept. 17, 1946 |
| 2,408,494 | Veneklasen | Oct. 1, 1946 |
| 2,468,721 | Volkmann | Apr. 26, 1949 |
| 2,529,467 | Wiggins | Nov. 7, 1950 |

FOREIGN PATENTS

| Number | Country | Date |
|---|---|---|
| 258,732 | Great Britain | Sept. 30, 1926 |
| 494,293 | Great Britain | Oct. 19, 1938 |